United States Patent
Nakagawa

[11] Patent Number: 6,053,573
[45] Date of Patent: Apr. 25, 2000

[54] CHILD SEAT

[75] Inventor: Osamu Nakagawa, Tokyo, Japan

[73] Assignee: Takata Corporation, Tokyo, Japan

[21] Appl. No.: 09/223,025

[22] Filed: Dec. 30, 1998

[30] Foreign Application Priority Data

Jan. 14, 1998 [JP] Japan .................................. 10-005817

[51] Int. Cl.[7] .................................................. A47C 1/08
[52] U.S. Cl. ................................ 297/250.1; 297/256.16; 297/237
[58] Field of Search .................................. 297/236, 237, 297/238, 250.1, 256.11, 338

[56] References Cited

U.S. PATENT DOCUMENTS

| | | |
|---|---|---|
| 4,603,903 | 8/1986 | Moscovitch . |
| 5,052,750 | 10/1991 | Takahashi et al. ............. 297/256.16 X |
| 5,265,934 | 11/1993 | Forget ....................................... 297/237 |
| 5,282,666 | 2/1994 | Demick et al. .......................... 297/237 |
| 5,788,326 | 8/1998 | Kawade et al. . |

FOREIGN PATENT DOCUMENTS

| | | |
|---|---|---|
| 3715312 | 11/1987 | Germany ............................... 297/237 |
| 44 15 877 | 11/1995 | Germany . |
| 4-35931 | 3/1992 | Japan . |
| 6-35774 | 9/1994 | Japan . |
| 9-39627 | 2/1997 | Japan . |

OTHER PUBLICATIONS

Patent Abstracts of Japan, vol. 97, No. 6, Jun. 30, 1997 & JP 09 030300 A (Honda Motor Co., Ltd), Feb. 4, 1997.

*Primary Examiner*—Laurie K. Cranmer
*Attorney, Agent, or Firm*—Kanesaka & Takeuchi

[57] ABSTRACT

A child seat is provided which can ensure to stop a seat plate at a desired level and which can easily allow the adjustment of the height of the seat plate. The seat plate having a front seat plate and a rear seat plate is supported to a seat body having a seat back such that the seat plate can be moved up and down. The seat plate is supported by front links and rear links. By moving backward or front ward a slide frame disposed on a lower surface of the seat plate, pins are guided by guide slits formed obliquely so that the pins advance or retreat to be in or out insertion holes.

12 Claims, 6 Drawing Sheets

CHILD SEAT

FIELD OF THE INVENTION

The present invention relates to a child seat for seating an infant therein and, more particularly, to a child seat to be put on a vehicle seat. In detail, the child seat to which the present invention relates is the child seat in which a seat plate can be moved up and down.

DESCRIPTION OF PRIOR ART

A child seat used in a vehicle for seating an infant therein includes a child seat in which a seat plate is adjustable in its height according to the size of the infant's body.

Disclosed in Japanese utility model application JU6-35774B is a child seat of a type that a seat plate can be fixed to a pair of guide grooves in a seat body. In the child seat, plural pairs of the guide grooves are formed in the seat body at various levels, respectively. However, the operation of adjusting its height is troublesome. Also disclosed in this publication is to adjust its height by a lifter mechanism, but it is not disclosed how to stop and fix the seat plate at a desired level.

Disclosed in JU4-35931A is a structure of supporting a seat plate such that the height of the seat plate can be adjusted by links. The seat plate is stopped by engaging ends of links with grooves so that this structure has a shortcoming that the links are apt to come off the grooves.

Disclosed in Japanese patent application JP9-39627A is a mechanism in which a seat plate is slidably mounted to bars extending up-and-down direction and the bars have a plurality of holes at various levels so that the seat plate is stopped by inserting the pins into the holes. However, this mechanism also has a shortcoming that the pins are apt to come off the holes.

OBJECT AND SUMMARY OF THE INVENTION

It is an object of the present invention to solve the problems described above and to provide a child seat which can easily allow the adjustment of a the height of seat plate and which can ensure the strength for stopping and fixing the seat plate.

A child seat of the present invention comprises a seat plate; a supporting mechanism for supporting the seat plate to allow the up-and-down movement of the seat plate; and a stopping means for stopping the seat plate at a desired level. The stopping means comprises a plurality of holes formed in seat sides of the child seat at various levels, pins disposed on the seat plate, ends of which can be inserted into the holes, and a pin retractable mechanism for allowing the pins to advance and retreat. The pin retractable mechanism comprises a slide member, a transmission mechanism for transforming and transmitting the sliding movement of the slide member to the movement of the pins in the advancing and retreating direction, and a biasing means of biasing the pins in a direction of inserting the pins into the holes.

According to the child seat, the seat plate is set at a desired level by inserting the pins into the holes. The pins are moved to advance and retreat by the slide member so that the pins are capable of easily entering and retracting relative to the holes by sliding the slide member. The pins are biased by the biasing means in the inserting direction so that the pins do not come off the holes as far as the slide member is not operated.

The slide member may be slidable along the lower surface of the seat plate and more preferably slidable in the longitudinal direction of the child seat. In this case, it is preferable that the slide member is provided with a handle and the handle is disposed beneath the front edge of the seat plate.

In order to move the pins to advance and retreat according to the sliding movement of the slide member, the slide member may be provided with guide slits obliquely extending and parts of the pins are inserted into the guide slits.

DETAILED DESCRIPTION OF THE PREFERRED EMBODIMENTS

Figure 1:
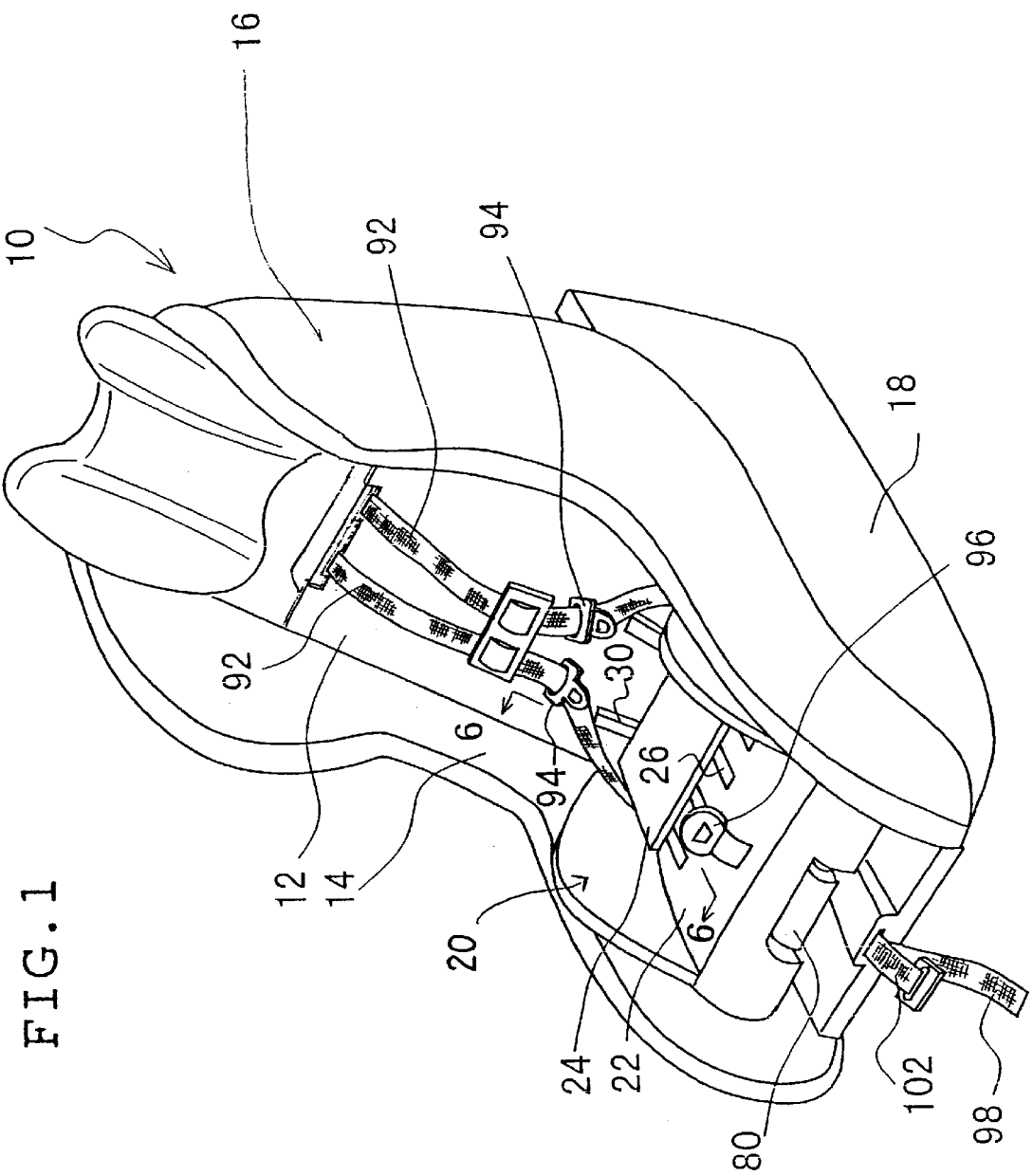
FIG. 1 is a perspective view of a child seat according to an embodiment.
Figure 2:
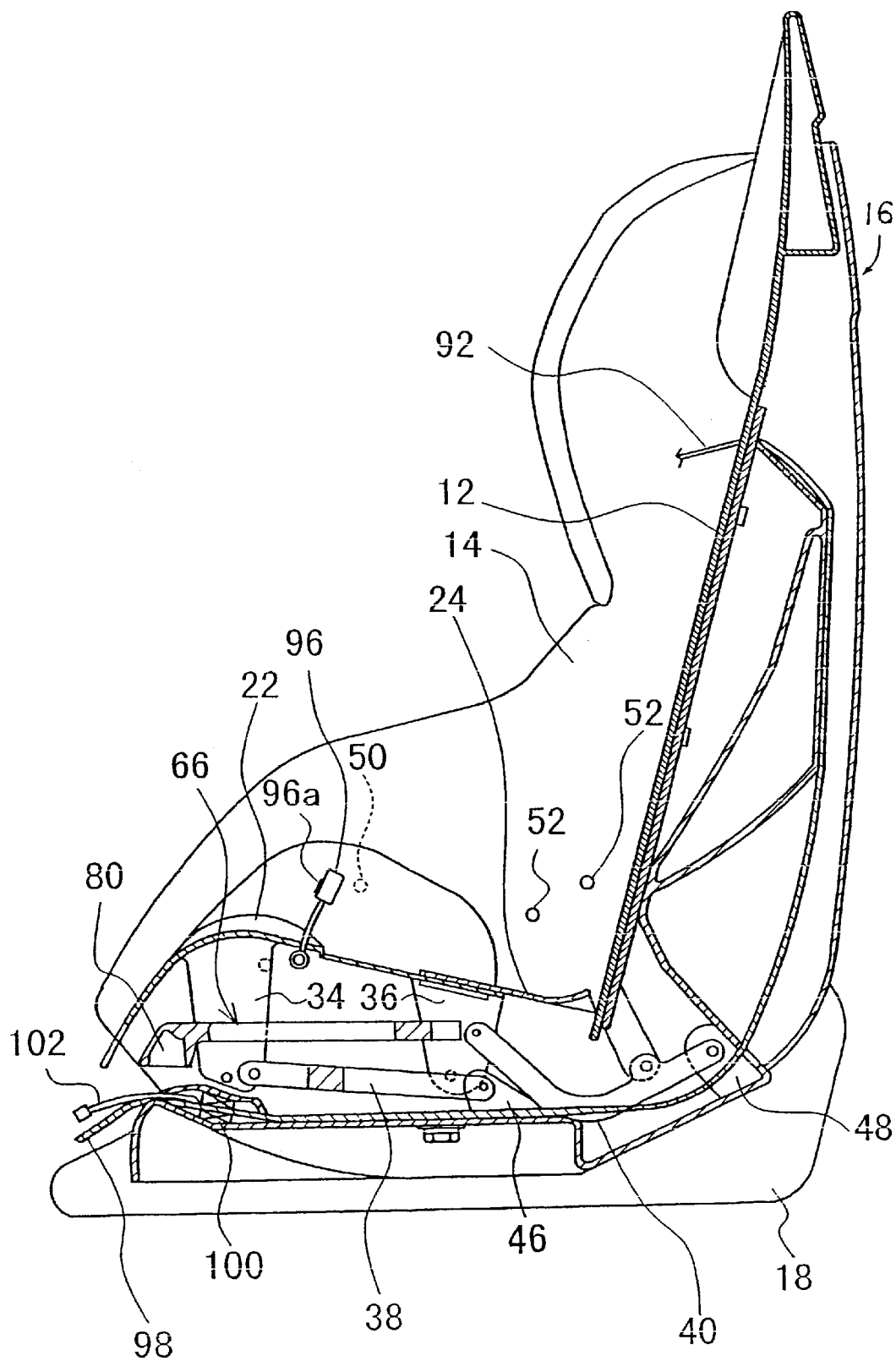
FIG. 2 is a vertical sectional view of the child seat of FIG. 1.
Figure 3:
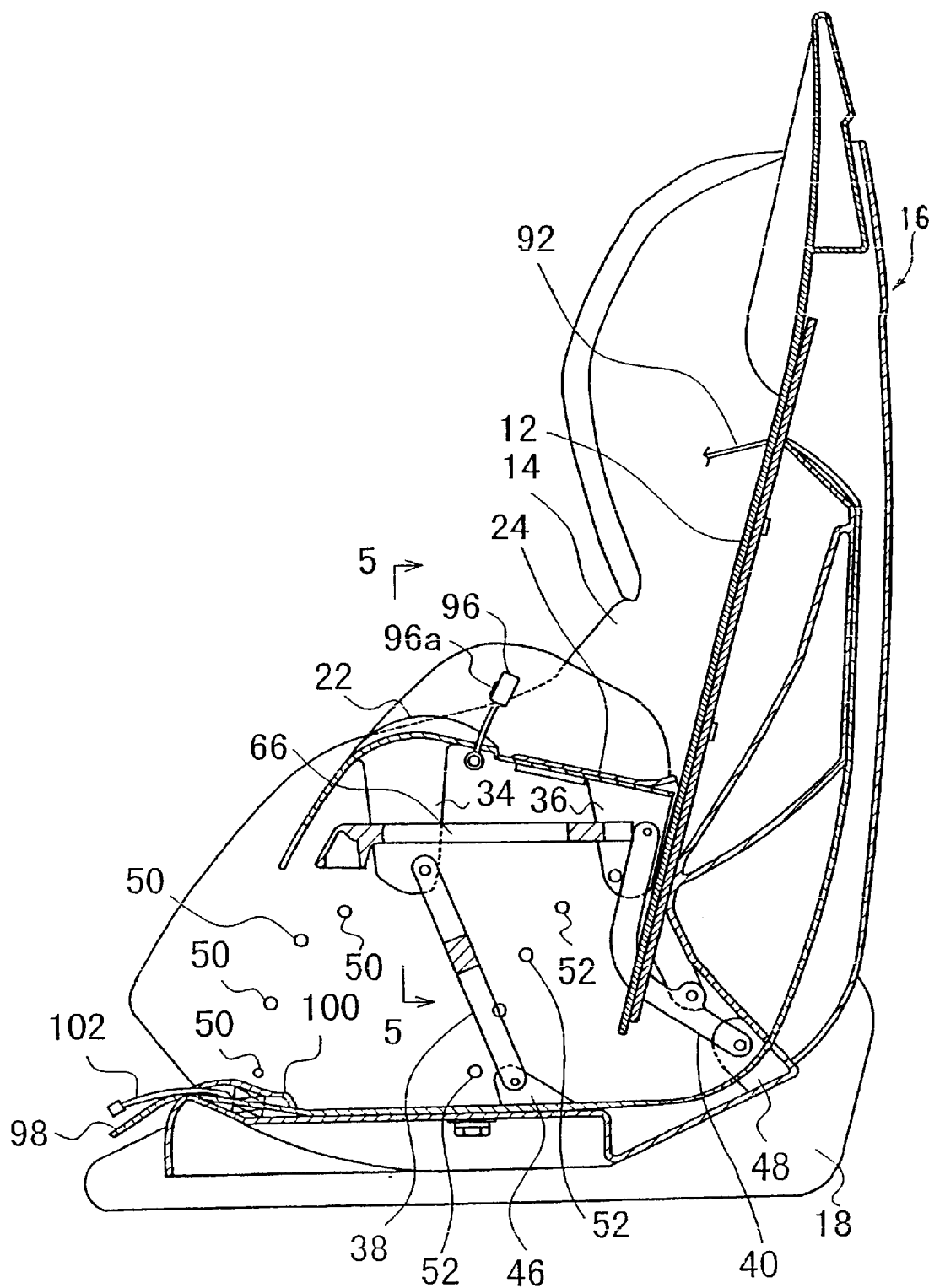
FIG. 3 is a sectional view of the child seat in a state that a seat plate is risen.
Figure 4:
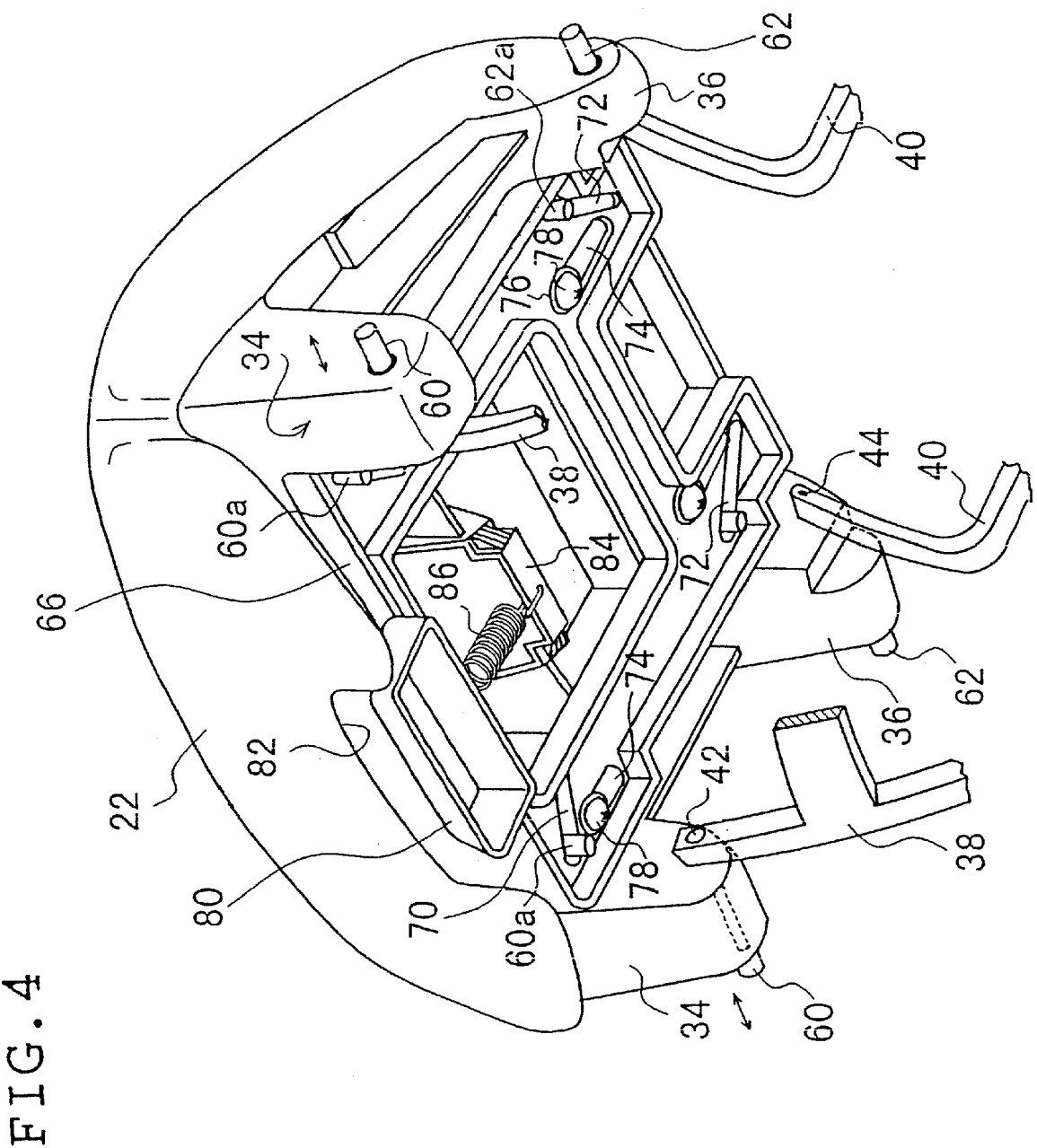
FIG. 4 is a perspective view of the seat plate and a slide frame taken from the underside.
Figure 5:
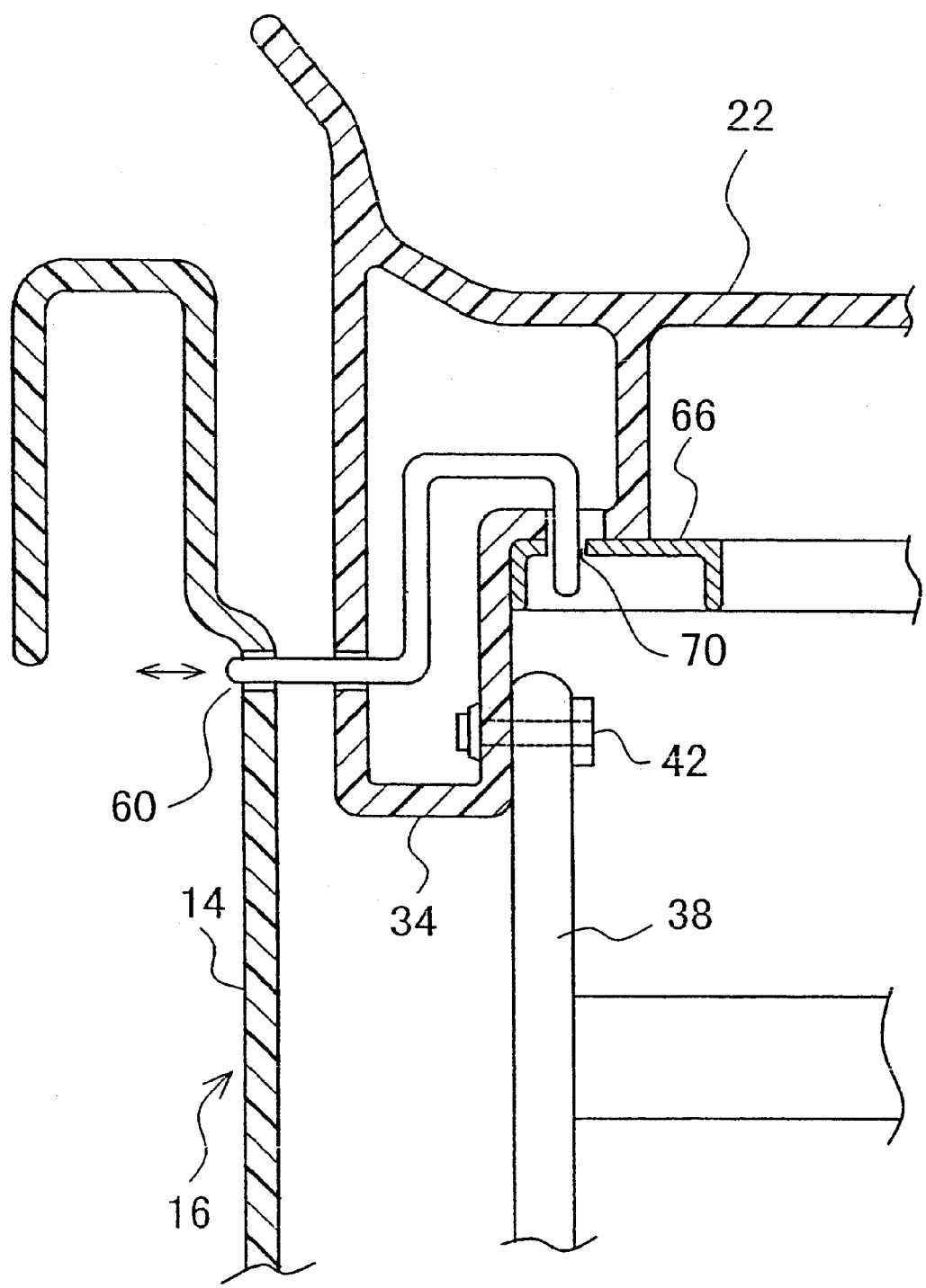
FIG. 5 is a sectional view taken along a line 5—5 of FIG. 3.

Hereinafter, a preferred embodiment of the present invention will be described with reference to the drawings. FIG. 1 is a perspective view of a child seat according to an embodiment, FIG. 2 and FIG. 3 are vertical sectional views of the child seat, FIG. 4 is a perspective view of a seat plate and a slide frame, as a slide member, taken from the underside, FIG. 5 is a sectional view taken along a line 5—5 of FIG. 3, FIG. 6 is a sectional view taken along a line 6—6 of FIG. 1, and FIG. 7 is a sectional view taken along a line 7—7 of FIG. 6.

A child seat 10 comprises a seat body 16 having seat sides 14, a seat back 12 fixed to the seat body 16, a seat plate 20 supported by the seat body 16 in such a manner that the seat plate 20 can travel move up and down, and a base 18 supporting the seat body 16. The seat plate 20 comprises a front seat plate 22 and a rear seat plate 24. The front edge portion of the rear seat plate 24 is slidably laid on the top surface of the rear edge portion of the front seat plate 22.

Figure 6:
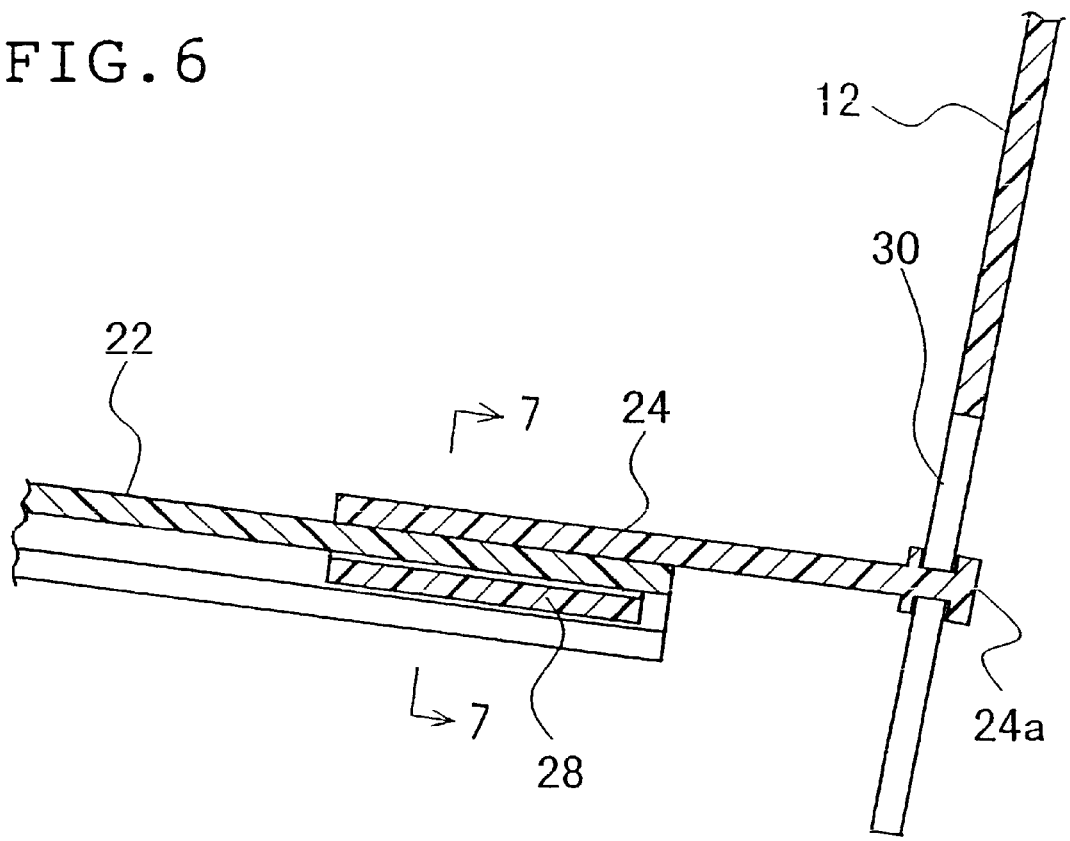
FIG. 6 is a sectional view taken along a line 6—6 of FIG. 1.
Figure 7:
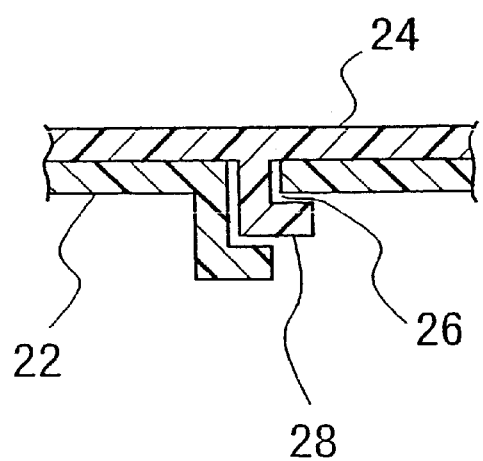
FIG. 7 is a sectional view taken along a line 7—7 of FIG. 6.

As shown in FIG. 6 and FIG. 7, the front seat plate 22 is provided with horizontal guide slits 26 extending in the longitudinal direction. The rear seat plate 24 is provided with projections 28 which are inserted into the horizontal guide slits 26 whereby the front seat plate 22 is slidably connected to the rear seat plate 24.

As shown in FIG. 6, the seat back 12 is provided with vertical guide slits 30 extending upwardly from the lower end thereof. Rear end portions 24a of the rear seat plate 24 are slidably engaged with the vertical guide slits 30, respectively. Therefore, the rear seat plate 24 is allowed to move up and down with keeping the state that it is connected to the seat back 12.

As shown in FIG. 4 and FIG. 5, the front seat plate 22 is provided with link connecting portions 34, 36 projecting downwardly from front-side and rear-side portions of the lower surface thereof, respectively. The respective upper ends of front links 38 and rear links 40 are rotatably connected to the link connecting portions 34, 36 by spindles 42, 44, respectively. The lower ends of the links 38, 40 are rotatably connected to link mounting members 46, 48 secured to the base 18, respectively.

The seat sides 14 composing the aforementioned seat body 16 are provided with insertion holes 50, 52 formed at various levels for receiving pins 60, 62. The pins 60, 62 for inserting into the insertion holes 50, 52 are disposed projecting from sides of the link connecting portions 34, 36.

As shown in FIGS. 4 and 5, rear ends 60a, 62a of the pins 60, 62 are inserted into guide slits 70, 72 which extend obliquely relative to the longitudinal direction of the child seat and which are formed in a slide frame 66 as a slide member.

The slide frame 66 has guide slits 74 extending in the longitudinal direction. Bolts 78 are inserted into the guide slits 74 via a slide washers 76 and are fixed to the link connecting portions 34, 36. Therefore, the slide frame 66 is attached to the front seat plate 22 in such a manner that the slide frame 66 can slide in the longitudinal direction of the child seat 10.

A handle 80 disposed at the front side of the slide frame 66 is positioned to face a notch 82 formed in a central portion of the front portion of the front seat plate 22.

A spring fixing member 84 is disposed to project from the lower surface of a central portion of the front seat plate 22. Disposed between the rear-side portion of the handle 80 and the fixing member 84 is a tension coil spring 86 which always biases the slide frame 66 rearwardly (in a direction toward the seat back 12).

As the slide frame 66 is pulled by gripping the handle 80, the rear ends 60a, 62a are guided by the obliquely extending guide slits 70, 72 so that the pins 60, 62 come off the insertion holes 50, 52. Accordingly, the seat plate 20 is allowed to move up and down. As the handle 80 is released, the slide frame 66 is pulled by the spring 86 to retreat and the pins 60, 62 are guided by the guide slits 70, 72 to project and thus enter into the insertion holes 50, 52.

The two shoulder belts 92 are extended to the front side of the child seat just like passing over the seat back 12. Tongues 94 are attached to the shoulder belts 92, respectively and are capable of latching a buckle 96 disposed on the front seat plate 22. Numeral 96a of FIG. 2 and FIG. 3 designates a press button for releasing the tongues 94 from the buckle 96.

The rear ends of the shoulder belts 92 are connected to a tension belt 98 which is extended to the front side of the child seat through a space under the seat back 12 and the seat plate 20 and through a belt locking mechanism 100. The belt locking mechanism 100 has a locking function which allows the free passage of the tension belt 98 when pulled forwardly but locks the passage of the tension belt 98 when pulled rearwardly. In order to release this locking function, a lock release belt 102 is provided. As the lock release belt 102 is pulled, the tension belt 98 is allowed to move rightward of FIG. 2 and FIG. 3.

The seat back 12, the seat sides 14, and the seat plate 20 are covered by suitable soft covers, but not shown.

To adjust the height of the seat plate 20 in the child seat as structured above, the handle 80 of the slide frame 66 is pulled to cause the pins 60, 62 to come off the insertion holes 50, 52 and the seat plate 20 is moved up or down as described above. As the handle 80 is released, the slide frame 66 retreats by the force of the spring 86 and the pins 60, 62 project. Then, by slightly adjusting the seat plate 20 up and down, the end portions of the pins 60, 62 enter into some of the insertion holes 50, 52 which are positioned thereabout so as to stop and fix the seat plate 20 at a desired position.

After the seat plate 20 is set at the desired position, the infant is seated on the seat plate 20 and then the tongues 94 are inserted into the buckle 96. Then, the tension belt 98 is pulled to secure the infant's body to the child seat.

In this embodiment, since the rear end of the rear seat plate 24 is always connected to the seat back 12 as mentioned above, a large space never exists between the seat plate 20 and the seat back 12 even when the seat plate 20 moves up and down and the front seat plate 22 moves forward or backward in accordance with the movement of the seat plate 20. Since the rear seat plate 24 is laid on the front seat plate 22, no space is caused therebetween.

In this embodiment, since the slide frame 66 is biased rearwardly by the spring 86, the pins 60, 62 do not retreat unless the slide frame 66 is pulled forwardly by the handle 80. Therefore, the strength for stopping and fixing the seat plate 20 to the seat sides 14 is extremely high. The adjustment for the height of the seat plate 20 is quite simple just by pulling the handle 80 as mentioned above.

As described above, the child seat can easily allow the adjustment of the height of the seat plate and can ensure the strength for stopping and fixing the seat plate.

What is claimed is:

1. A child seat comprising:
   a seat body for a child seat, having seat sides;
   a seat plate situated between the seat sides and supported by the seat body;
   a supporting mechanism for supporting said seat plate to allow an up-and-down movement of said seat plate relative to the seat body; and
   stopping means for stopping said seat plate at a desired level, said stopping means including a plurality of holes formed in the seat sides of the seat body at various vertical levels, pins disposed on the seat plate, ends of which can be inserted into the holes, and a pin retractable mechanism for allowing the pins to advance and retreat, said pin retractable mechanism having a slide member slidably situated under the seat plate, a transmission mechanism for transforming and transmitting a sliding movement of said slide member to movements of said pins in the advancing and retreating direction, and biasing means of biasing the pins in a direction of inserting the pins into the holes so that when the slide member is actuated, the pins are retracted from the holes to allow the seat plate to move to a desired vertical level.

2. A child seat as claimed in claim 1, wherein said slide member can slide along a lower surface of said seat plate.

3. A child seat as claimed in claim 2, wherein said slide member can slide in a longitudinal direction of said child seat.

4. A child seat as claimed in claim 3, wherein said transmission mechanism comprises guide slits formed in said slide member to extend obliquely to the longitudinal direction and parts of said pins are inserted in said guide slits.

5. A child seat as claimed in claim 3, wherein said slide member has a handle disposed beneath a front edge of said seat plate.

6. A child seat as claimed in claim 2, wherein said biasing means is a spring biasing said slide member.

7. A child seat as claimed in claim 1, wherein said supporting mechanism is a linkage.

8. A child seat as claimed in claim 7, wherein said linkage comprises front links and rear links for moving the seat plate in parallel.

9. A child seat as claimed in claim 8, wherein said seat plate is provided with link connecting portions projecting downward from front and rear portions of said seat plate and wherein said front links are rotatably connected to the link connecting portions disposed at the front side and said rear links are rotatably connected to the link connecting portions disposed at the rear side.

10. A child seat as claimed in claim 9, wherein said each link connecting portion is provided with a hole formed on a side thereof and said each pin passes through said hole and projects sideways of the seat plate.

11. A child seat comprising: a seat plate; a supporting mechanism for supporting said seat plate to allow an up-and-down movement of said seat plate; and stopping means for stopping said seat plate at a desired level, wherein said stopping means comprises a plurality of holes formed in seat sides of the child seat at various levels, pins disposed on the seat plate, ends of which can be inserted into the holes, and a pin retractable mechanism for allowing the pins to advance and retreat, and said pin retractable mechanism comprises a slide member slidable along a lower surface of the seat plate in a longitudinal direction of the child seat, a transmission mechanism for transforming and transmitting a sliding movement of said slide member to movements of said pins in the advancing and retreating direction, and biasing means of biasing the pins in a direction of inserting the pins into the holes.

12. A child seat comprising: a seat plate; a supporting mechanism for supporting said seat plate to allow an up-and-down movement of said seat plate, said supporting mechanism being formed of a linkage including front links and rear links for moving the seat plate in parallel; and stopping means for stopping said seat plate at a desired level, wherein said stopping means comprises a plurality of holes formed in seat sides of the child seat at various levels, pins disposed on the seat plate, ends of which can be inserted into the holes, and a pin retractable mechanism for allowing the pins to advance and retreat, and said pin retractable mechanism comprises a slide member, a transmission mechanism for transforming and transmitting a sliding movement of said slide member to movements of said pins in the advancing and retreating direction, and biasing means of biasing the pins in a direction of inserting the pins into the holes.

\* \* \* \* \*